United States Patent [19]

Nitta et al.

[11] Patent Number: 4,733,037

[45] Date of Patent: Mar. 22, 1988

[54] HIGH FREQUENCY HEATING DEVICE HAVING AN ENERGY FEED SYSTEM INCLUDING A CYLINDRICAL WAVE GUIDE

[75] Inventors: Masahiro Nitta; Kimiaki Yamaguchi, both of Nara; Yoshihiro Toda, Kyoto; Kazuyuki Inoue, Yamatokoriyama, all of Japan

[73] Assignee: Matsushita Electric Industrial Co., Ltd., Osaka, Japan

[21] Appl. No.: 941,896

[22] Filed: Dec. 15, 1986

[30] Foreign Application Priority Data

Dec. 17, 1985 [JP] Japan ................................ 60-283414

[51] Int. Cl.⁴ ................................................ H04B 6/72

[52] U.S. Cl. ........................ 219/10.55 F; 219/10.55 A

[58] Field of Search ................. 219/10.55 F, 10.55 A, 219/10.55 R

[56] References Cited

U.S. PATENT DOCUMENTS 3,789,179 1/1974 Haagensen .................... 219/10.55 F
4,185,181 1/1980 Kaneko et al. ............... 219/10.55 F
4,424,430 1/1984 Almgren et al. ............. 219/10.55 F
4,463,239 7/1984 Miller ........................... 219/10.55 F
4,496,814 1/1985 Fitzmayer ..................... 219/10.55 F

*Primary Examiner*—Philip H. Leung
*Attorney, Agent, or Firm*—Spencer & Frank

[57] ABSTRACT

A high frequency heating device includes a high frequency oscillator, a heating chamber for accommodating an object to be heated, and a cylindrical wave guide for coupling the high frequency oscillator to the heating chamber. The output antenna for the high frequency oscillator is disposed at an input end portion of the cylindrical wave guide and along the center axis of the wave guide. The heating chamber has a wall which is coupled to the cylindrical wave guide, the wall being positioned in an end plane of the cylindrical wave guide opposite to the output antenna. An arcuate slit is formed in the wall with the center of curvature of the slit being centered at the center axis of the cylindrical wave guide. This construction suppresses higher harmonics, and furthermore impedance matching and adjustment of the heating performance are facilitated.

18 Claims, 9 Drawing Figures

HIGH FREQUENCY HEATING DEVICE HAVING AN ENERGY FEED SYSTEM INCLUDING A CYLINDRICAL WAVE GUIDE

BACKGROUND OF THE INVENTION

1. Field of the Invention

The present invention relates to feed means for a high frequency or radio frequency (abbreviated as RF) heating device which heats an object such as food by high frequency dielectric heating, and more particularly to the prevention of leakage of higher harmonic electromagnetic wave components other than a fundamental frequency electromagnetic wave component used for the heating purpose.

2. Description of the Related Art

A frequency band permitted for use in an R.F. heating device is only permitted to use a specific frequency band (usually called an ISM band), although the band may differ from country to country, such as the 915 MHz band, the 2450 MHz band, etc. So long as there is no danger to the human body and safety is assured, there is no legal regulation on the frequency band. However, an RF oscillator usually generates higher harmonic components. In a magnetron, which is a microwave oscillator, oscillating at a fundamental frequency (fo) of 2450 MHz, relatively high power components are generated at 4900 MHz, 7350 MHz, 9800 MHz, and 12250 MHz, which are integral order higher harmonic components of the fundametal frequency (those components are represented by 2fo, 3fo, 4fo and 5fo).

Those higher harmonic components are subject to severe legal regulation in order to prevent disturbance to communication equipment.

Accordingly, various approaches to suppress the higher harmonic components have been made. FIGS. 1 and 2 show schematic sectional views of prior art RF heating devices having such a kind of means. In FIG. 1, a wave guide 3 is used as means for coupling a rectangular heating chamber 1 formed by conductive walls to an RF oscillator 2. An object 4 to be heated is placed in the heating chamber on a plate 5 made of a low dielectric material. The heating chamber walls have exhaust holes 6, through which water vapor generated from the object 4 during the heating is exhausted, and air inlet holes 7, through which fresh air is supplied, and a door 8 through which the object 4 is taken in and out of the heating chamber 1.

RF electromagnetic energy including higher harmonic components generated by the RF oscillator 2, is directed to the heating chamber 1 through the wave guide 3.

Once the higher harmonic components are fed into the heating chamber 1, they are transmitted out of the RF heating device through many paths, such as the exhaust holes 6, air inlet holes 7 and clearances between the door 8 and the heating chamber walls. As a result, it is difficult to design electromagnetic wave leakage prevention means to be arranged around the door. Thus, in order to attenuate the higher harmonic components themselves of the RF wave fed into the heating chamber, conductive bars 9, 10 and 11 of different lengths are mounted in the wave guide 3 to form a resonator operating as a band-pass filter in order to prevent the transmission of higher harmonic components other than the fo component into the heating chamber (Japanese Examined Utility Model Publication No. 51-14514).

However, in the structure in which the conductive bars 9, 10 and 11 of different lengths project, the suppression frequency band is very narrow because the suppression frequency is determined by the projection length. In order to widen the suppression frequency band, the number of conductive bars may be increased. However, the conductive bars have to be spaced from each other by a predetermined distance in order to prevent electric discharge due to the concentration of RF wave energy. Accordingly, if the conductive bars are selected one for each higher harmonic component, the length of the wave guide increases and the overall construction of the device becomes complex and expensive.

In FIG. 2, conductive plates 12, 13 and 14 each thereof having a width along a center axis of the wave guide 3 are arranged at spatial intervals of approximately λg/2, where λg is the wavelength of the fo component in the wave guide, to form a three-dimensional resonator to prevent transmission of electromagnetic waves having frequencies other than fo. However, it is difficult to dispose such three-dimensional circuit elements, which resonate only at fo, in a closed wave guide. Further, since such elements are arranged on the axis of the wave guide where the electric field strength is highest, large RF currents flow through the conductive plates and leads to a loss of the fundamental frequency component.

SUMMARY OF THE INVENTION

It is an object of the present invention to reduce the loss of the fundamental electromagnetic wave and to attenuate higher harmonic components using a simple construction, thereby reducing higher harmonic component leakage from an RF heating device and improving performance.

In the RF heating device of the present invention, a wave guide for coupling a heating chamber, in which an object to be heated is placed, to an RF oscillator has a substantially cylindrical shape, and a feed port of the wave guide for feeding the heating chamber has an arcuate slit shape.

Generally, in a wave guide having a rectangular cross-section, the RF propagation mode in the wave guide is $TE_{10}$ for the fundamental wave, and the electric field peak thereof becomes zero in the height direction of the wave guide. However, for the fifth higher harmonic component, the propagation modes of $TE_{50}$ as well as $TE_{51}$, $TE_{52}$, etc. are generated freely. This is also true for the other higher harmonic components. Accordingly, the electric field distributions for the respective higher harmonic components in the wave guide are complex, which makes it difficult to attenuate higher harmonic components when using higher harmonic component suppression circuit elements. However, by using a cylindrical wave guide, a plurality of electric field distribution patterns are arranged orderly in the circumferential direction even in the case of higher harmonic propagation modes. Furthermore, since the arcuate slit functions as a large reactance element against higher harmonic components existing in the cylindrical wave guide, higher harmonic components are greatly attenuated. Besides, since the slit is located at an end portion of the wave guide, the length of the wave guide can be shortened without regard to the wavelength in the wave guide and the loss of the fundamental frequency wave used for the purpose of heating is reduced.

DESCRIPTION OF THE PREFERRED EMBODIMENTS

Figure 1:
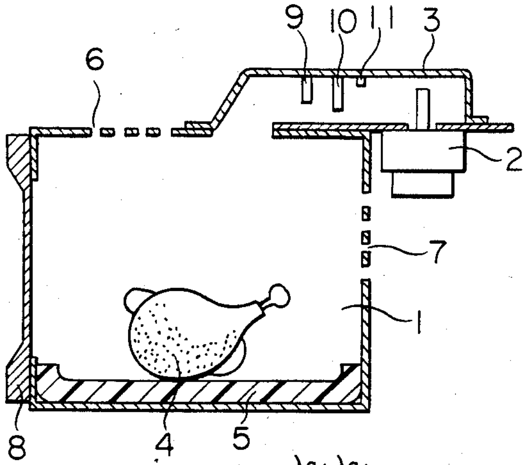
FIG. 1 PRIOR ART
FIGS. 1 and 2 are sectional views of prior art RF heating devices having higher harmonic component suppression means.
Figure 2:
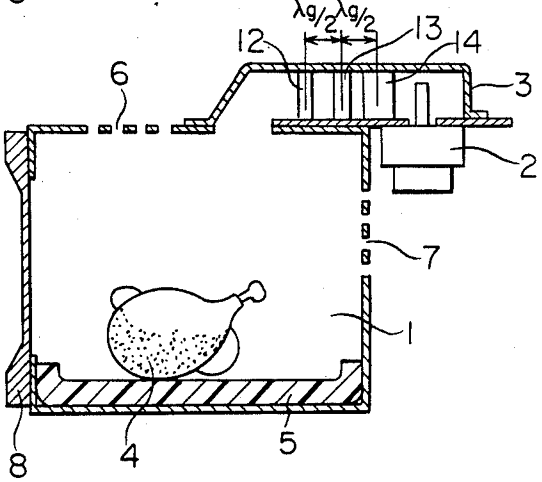
FIG. 2 PRIOR ART
Figure 3:
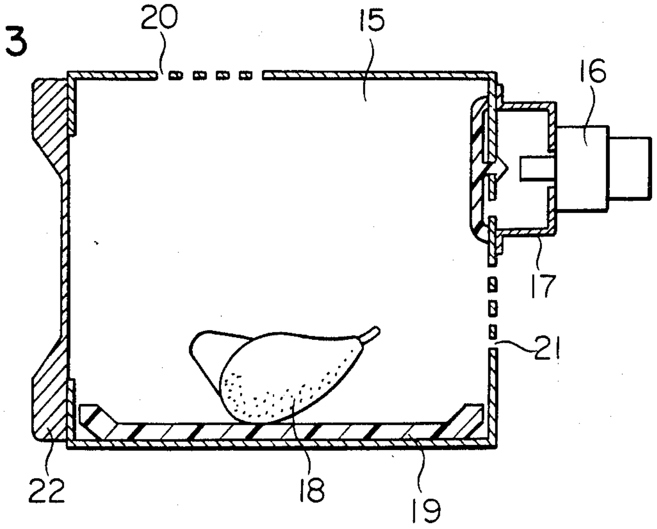
FIG. 3 shows an RF heating device having higher harmonic component suppression means in accordance with an embodiment of the present invention.

FIG. 3 shows an embodiment of an RF heating device of the present invention.

In FIG. 3, a wave guide 17 is used as means for coupling a rectangular heating chamber 15 formed by conductive walls to a magnetron 16, which is an RF oscillator. An object 18 to be heated is placed in the heating chamber 15 on a plate 19 made of a low dielectric material. Exhaust holes 20 for exhausting water vapor and heat generated during the heating from the device, air inlet holes 21 for supplying fresh air and a door 22 for taking the object 18 in and out are disposed in the walls of the heating chamber.

Figure 4:
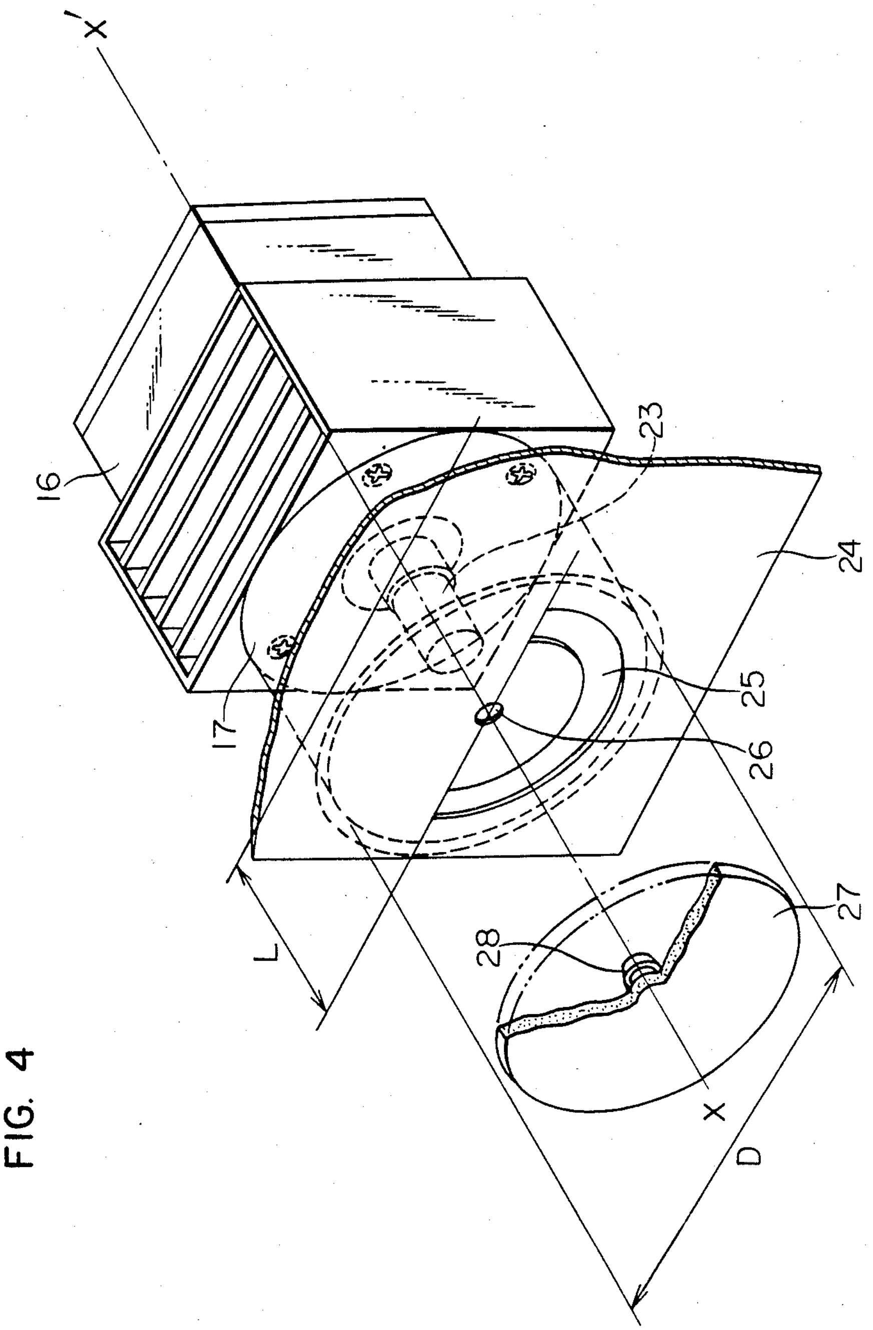
FIG. 4 is an enlarged perspective view showing a coupling portion of the higher harmonic component suppression means.

FIG. 4 shows an enlarged perspective view of the wave guide 17 which serves as a coupler to the magnetron 16. The construction of the coupling portion will be described hereunder.

The RF wave generated by the magnetron 16 is radiated from an output antenna 23 having a length equal to approximately ¼ of its free space wavelength $\lambda$. The output antenna is positioned on the center axis X–X' of the cylindrical wave guide 17, which has a length L and a diameter D. An end portion of the wave guide 17 opposite to the output antenna 23 is formed by a wall 24. An arcuate slit 25 which is concentric with the wave guide 17 is formed in the wall 24. The RF wave emitted from the output antenna 23 is transmitted through the wave guide 17 and transmitted into the heating chamber through the arcuate slit 25, which functions as a secondary radiation antenna.

A center hole 26 is formed in the wall 24 at a portion thereof where the center axis of the wave guide passes. The center hole 26 serves as means for detecting any deviation of the output antenna 23 from the center axis of the wave guide 17 and also serves as means for providing the coupling between the wall 24 and a cover 27, which is provided to prevent water vapor and any material emitted from the object 18 from entering the wave guide 17 through the slit 25. The cover 27 is circular and completely covers the slit 25. It is made of a low dielectric material such as polypropylene, Teflon, etc. in order to avoid heating by the RF wave. An elastic projection 28 is inserted into the center hole 26 to fix the cover 27 to the wall 24.

The state of the RF wave in the cylindrical wave guide will now be considered. The main mode in the cylindrical wave guide, which is the most stable excitation mode and which has a maximum cutoff wavelength in the cylindrical wave guide, is a circular $TE_{11}$ mode. This mode is an excitation pattern similar to $TE_{10}$, which is the main mode in a rectangular wave guide, and the cutoff wavelength is related to the diameter D of the wave guide, that is, approximately, 1.706 D. This is a condition when the wave guide length L, which is a transmission path length, is longer than $\lambda g/2$ (where $\lambda g$ is the wavelength in the wave guide).

If L is shorter than $\lambda g/2$, the cutoff wavelength becomes longer. Thus, if a wave guide of the same diameter is used, the frequency of an electromagnetic wave which can be transmitted therethrough is lowered. Accordingly, if a small diameter is desired, the wave guide length has to be selected to be longer than $\lambda g/2$.

The excitation mode changes with the position of the output antenna 23. In order to attain stable excitation of the main circular mode $TE_{11}$, the output antenna 23 has to be positioned on the center axis of the wave guide.

All the values of the cutoff wavelength and the main mode are applicable to the fundamental frequency. For the higher harmonic components, the wavelength becomes shorter and higher order modes such as $TE_{21}$, $TE_{31}$, etc. other than the main mode are apt to be generated.

An important factor when using a wave guide having a slit, which is used as the output antenna, is the RF wall current. If the slit is formed perpendicularly to the wall current, the wall current is separated and an effective radiation antenna is obtained.

In any mode including the main mode of the fundamental wave and the higher order modes of the higher harmonic components generated in the cylindrical wave guide, the wall current generated in the wall 24 positioned in the end plane of the cylindrical wave guide 7 may be of a pattern having several circumferential intensity variations. The wall current becomes minimum at the center portion of the cylindrical wave guide 17, so that the heating of the projection 28 of the cover 27 inserted into the center hole 26 can be prevented.

Since the cover 27 is supported at the center hole 26, it may rotate. However, since the cover 27 is formed in a disk shape, it can completely cover the slit 25 even if it rotates. An auxiliary engaging piece (pawl) for preventing the rotation of the cover 27 may be used. In this case, since the density of the energy of the electromagnetic wave of the fundamental frequency, which is transmitted through the slit 25, is reduced at the circumferential peripheral portion thereof as compared with the center portion thereof, if the engaging piece is disposed at a portion of the circumferential periphery of the slit 25, it is possible to reduce the heating thereof.

As described above, while, in a rectangular wave guide, the wall currents generated in the wave guide walls have complex patterns depending on the excitation modes, in the case of a cylindrical wave guide, an orderly pattern can be formed in the end plane thereof.

Figure 5:
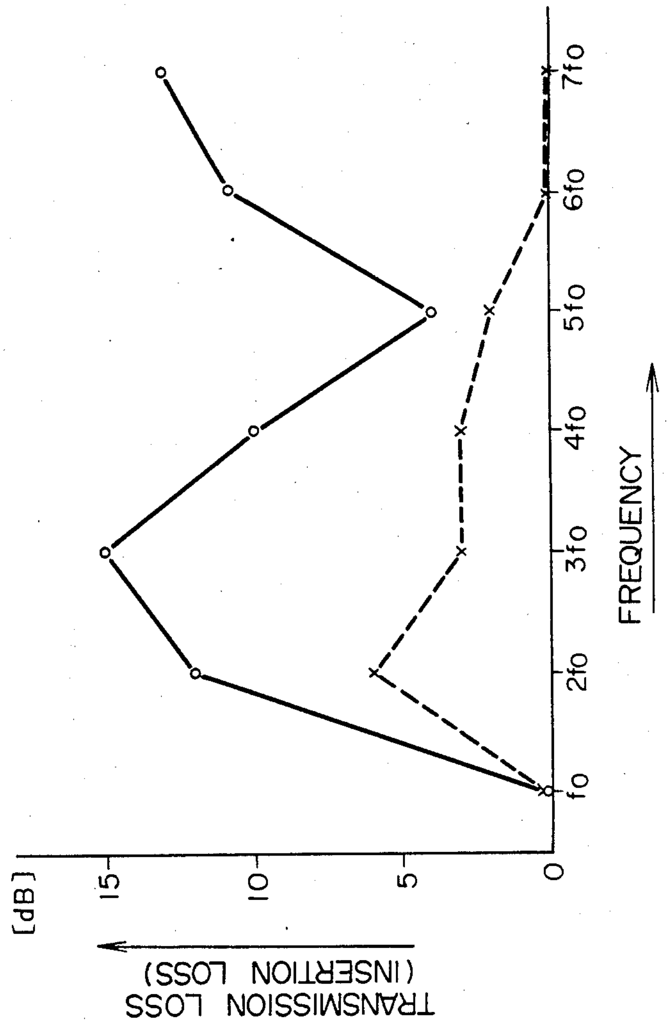
FIG. 5 shows an experimental result which compares the performance of the RF heating device having the higher harmonic component suppression means of the present invention with that of the prior art.

The arcuate slit 25 concentric with the cylindrical wave guide is perpendicular to the wall currents generated in the main mode of the fundamental wave, so that an effective radiation antenna can be obtained. On the other hand, the slit is not completely perpendicular to the wall currents generated in the higher order modes of the higher harmonic components, so that it provides a high reactance component, whereby higher harmonic components transmitted from the slit can be suppressed. FIG. 5 shows an experimental result which compares the performance of the RF heating device having the higher harmonic components suppression means of the present invention with that of the prior art device having no suppression means.

In FIG. 5, the solid line shows the case of an embodiment of the present invention and the broken line shows the case of the prior art device. The abscissa represents frequency, and the ordinate represents the transmission loss caused in the transmission path from the magnetron output antenna to the heating chamber. As shown in FIG. 5, in the embodiment of the invention, the loss (insertion loss) of the fundamental frequency (fo) wave is small, while, the loss of higher harmonic components is greater than in the prior art device, and thus it is possible to effectively suppress higher harmonic components.

Figure 6A:
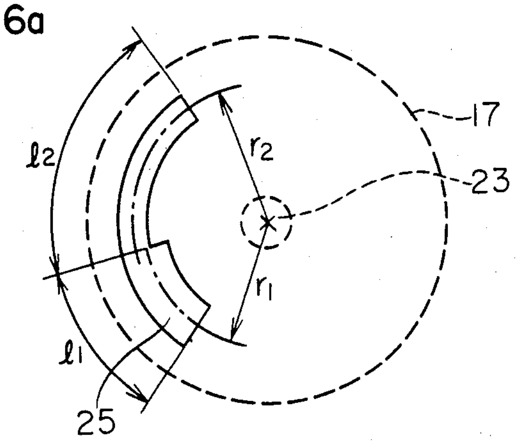
FIGS. 6*a*, 6*b* and 6*c* are plan views showing various modifications of the slit for use in the higher harmonic component suppression means of the present invention.
Figure 6B:
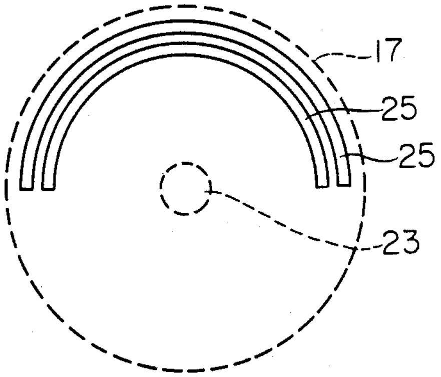
Figure 6C:
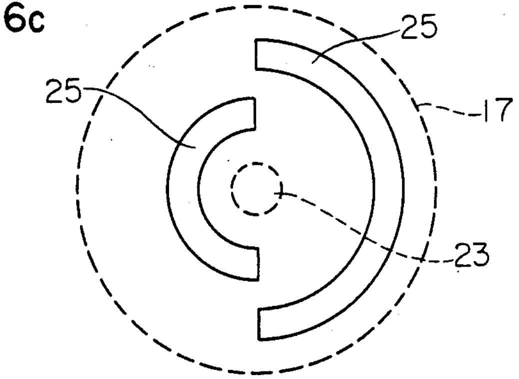

FIGS. 6*a*, 6*b* and 6*c* show various modifications of the slit, where the shape and the number of slits are changed. By changing the shape, number and position of the slit 25 while keeping the slit 25 concentric with the cylindrical wave guide 17, it is possible to effect the impedance matching between the magnetron and the load, namely, the heating chamber including the object to be heated, as well as to adjust the device for attaining uniform heating of the object 18.

Variations in the effects of the suppression of the respective higher harmonic components are considered to be due to changes in the state of separation of the wall currents in the higher order modes caused by the provision of the slit 25, which changes give rise to respective reactance elements having different frequency characteristics.

The excitation modes which are most apt to occur differ depending on respective higher harmonic components and the frequency characteristics change depending on the position (the distance from the center) of the slit 25, and the radial width and a circumferential length of the slit 25. Accordingly, the best condition for suppressing any particular higher harmonic component differs case by case. In FIG. 6*a*, the radii ($r_1$, $r_2$) and lengths ($l_1$, $l_2$) of the respective center lines of two portions of the slit 25 are made to differ from each other thereby to suppress a plurality of higher harmonic components. As shown in FIGS. 6*b* and 6*c*, any one or both of the radius and length of the slit 25 may be changed to obtain a similar result.

With the above-described arrangements it is possible to provide new effects which cannot be attained only by a single slit. However, such a combination of the slits 25 can give the similar merits of a low insertion loss for the fundamental frequency and the suppression of higher harmonic components.

Figure 7:
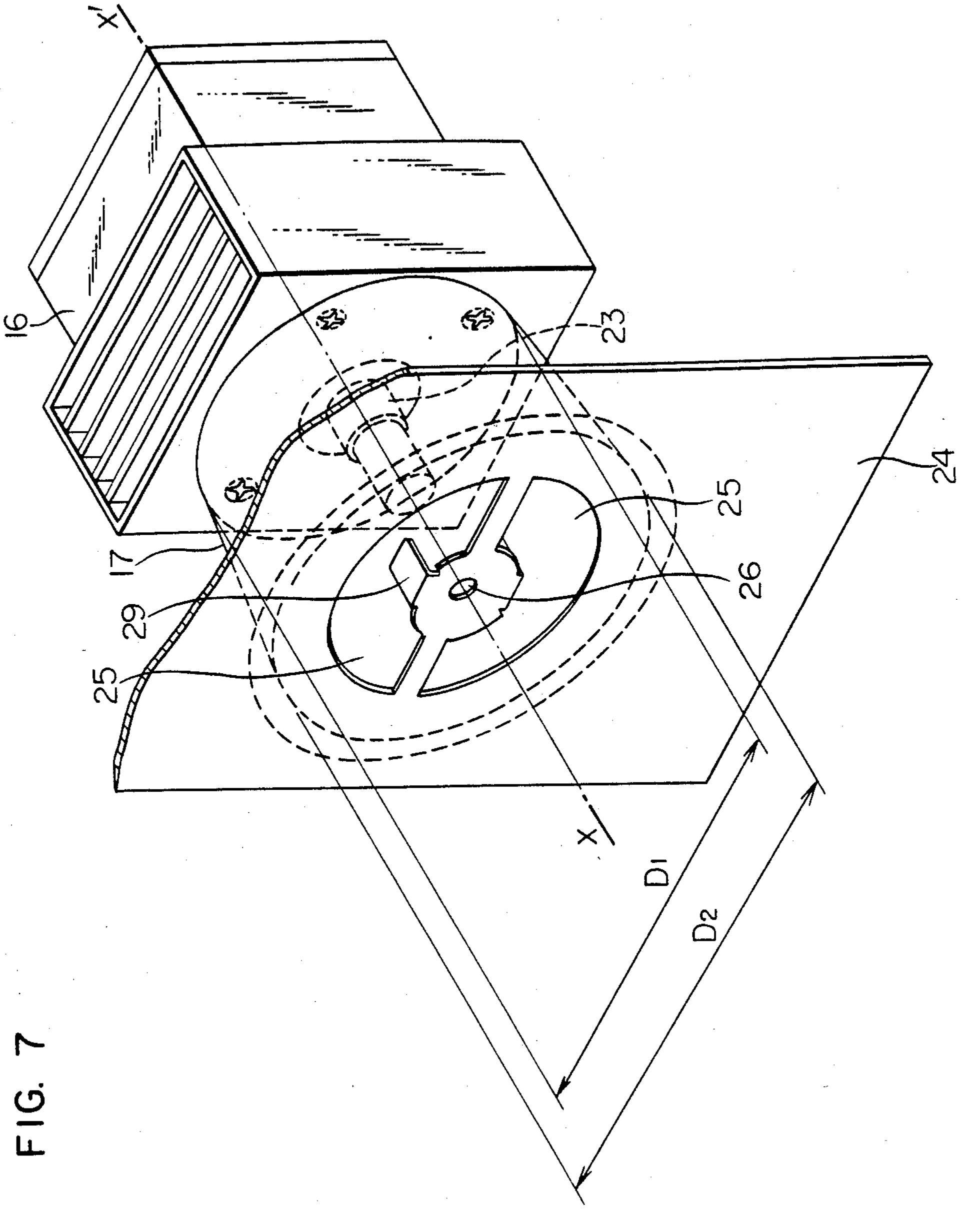
FIG. 7 is an enlarged perspective view showing the coupling portion of the RF heating device having the higher harmonic component suppression means of another embodiment of the present invention.

FIG. 7 shows an enlarged view of another embodiment of the present invention. In FIG. 7, the cylindrical wave guide 17 is tapered with respect to the center axis (X–X') of the wave guide. That is, the diameter $D_1$ at the end adjacent of the output antenna 23 of the magnetron 16 is smaller than the diameter $D_2$ at the end adjacent the heating chamber wall. By making the wave guide have a tapered shape, the wave guide may be integrally formed by drawing, etc. The cylindrical wave guide thus integrally formed is fixed to the heating chamber wall 24 by a welding operation and so on.

When the slit 25 is formed in the heating chamber wall 24, a portion of the wall, which otherwise would be cast away, is folded at a peripheral portion of the slit 25 maintaining the proper shape of the slit 25 thereby to protrude into the wave guide and form a conductive member 29.

Since the conductive member 29 is disposed near the output antenna 23, it is possible to change the load impedance by the shape or number of the conductive member 29 or the relative position between the output antenna 23 and the conductive member 29. Accordingly, the impedance matching between the magnetron and the heating chamber can be adjusted without interfering with the suppression of higher harmonic components by the slit 25. Thus, it is possible to satisfy separately the two technical requirements of the suppression of higher harmonic components and the improvement of operation efficiency caused by the impedance matching.

The RF heating device having the higher harmonic components suppression means accoding to the present invention can give the following advantages.

(1) Since the RF wave is supplied to the heating chamber through the slit formed in the end plane of the cylindrical wave guide, by making the electric field distribution and the wall current, (which depend on the excitation mode in the culindrical wave guide) have respective orderly patterns, it is possible to provide a slit antenna functioning as a reactance element. Such a slit antenna provides a small insertion loss to the fundamental frequency electromagnetic wave and a great loss to higher harmonic components. Thus, it becomes possible to suppress greatly higher harmonic components.

(2) Since the wave guide is a cylindrical wave guide, it is possible to select freely the shape, number and distribution of the slit(s) arranged concentrically with the wave guide. Accordingly, the impedance matching and the adjustment of the heating performance may be effected independently of the adjustment of the higher harmonic components suppression means. As a result, it becomes easy to improve the efficiency of the device and the uniform heating performance.

(3) The cylindrical wave guide can be formed as one body by drawing, unlike the rectangular wave guide. Accordingly, the manufacture of the wave guide becomes easy, the working precision is elevated, the manufacturing cost is lowered, the size of the device is reduced, and the performance of the device becomes stable.

(4) The slit formed in the wall of the heating chamber is the sole constituent element other than the cylindrical wave guide, and no other additional constituent member is required in the wave guide. Accodingly, the structure of the device becomes simple, so that the manufacturing cost is reduced and it becomes possible to avoid the danger such as an electric spark occurring in the wave guide.

(5) Since the slit 25 and the conductive member 29 for effecting impedance matching can be formed as one body, no junction is included in the transmission path. Accordingly, the structure of the device is simple, the working precision is improved, the manufacturing cost is reduced, and the performance of the device becomes stable.

(6) Since the dielectric cover may be fixed to a portion of the wall in the end plane of the wave guide where the wall loss is low, it is possible to prevent the dielectric cover from being burnt by the high frequency heating. Furthermore the dielectric cover is formed to have a disk shape so as to be able to cover the slit completely. Since the dielectric cover may be fixed merely by the engagement of its center portion, high safety is assured, and the manufacturing cost is reduced.

What we claim is:

1. A high frequency heating device comprising:
- a high frequency oscillator having an output portion which includes an output antenna;
- a heating chamber for accommodating an object to be heated, said heating chamber having a wall; and
- a cylindrical wave guide having an end which is coupled to said output portion of said high frequency oscillator and having an opposite end which is coupled to said wall of said heating chamber, said output antenna of said high frequency oscillator being disposed on the center axis of said cylindrical wave guide and said wall of said heating chamber having at least one arcuate slit formed therein, with the center of curvature of said at least one arcuate slit being positioned on the center axis of said cylindrical wave guide.

2. A high frequency heating device according to claim 1, wherein said cylindrical wave guide has a substantially truncated cone shape.

3. A high frequency heating device according to claim 1, wherein said at least one arcuate slit has at least two different widths along the respective slit.

4. A high frequency heating device according to claim 1, wherein a plurality of arcuate slits are formed in said wall of said heating chamber, with at least one of the distance between the arcuate slits and the center axis of said cylindrical wave guide, the circumferential length of the arcuate slits, and the radial width of the arcute slits being different from each other.

5. A high frequency heating device according to claim 1, further comprising a conductive member formed by folding a peripheral portion of said at least one arcuate slit toward said output antenna of said high frequency oscillator.

6. A high frequency heating device according to claim 1, further comprising a disk-shaped dielectric cover fixed to a hole provided in said wall of said heating chamber and lying on the center axis of said cylindrical wave guide to cover said at least one arcuate slit.

7. A high frequency heating device according to claim 1, wherein said wall of said heating chamber has an outer surface, said opposite end of said cylindrical wave guide being coupled to said outer surface.

8. A high frequency heating device comprising:
- a high frequency oscillator having an output portion which includes an output antenna;
- a heating chamber for accommodating an object to be heated, said heating chamber having a wall; and
- a cylindrical wave guide having an end which is coupled to said output portion of said high frequency oscillator and having an opposite end which is coupled to said wall of said heating chamber, said output antenna of said high frequency oscillator being disposed on the center axis of said cylindrical wave guide, and said wall of said heating chamber having at least one arcuate slit formed therein, with the center of curvature of said at least one arcuate slit being positioned on the center axis of said cylindrical wave guide, said at least one arcuate slit being positioned on said wall so that a fundamental frequency electromagnetic wave generated by said high frequency oscillator is transmitted to said heating chamber with a small loss and harmonic components of the fundamental frequency electromagnetic wave are propagated to said heating chamber with greater attenuation.

9. A high frequency heating device according to claim 8, wherein said cylindrical wave guide has a substantially truncated cone shape.

10. A high frequency heating device according to claim 8, further comprising a conductive member formed by folding a peripheral portion of said at least one arcuate slit toward said output antenna of said high frequency oscillator.

11. An RF heating device according to claim 8, further comprising a disk-shaped dielectric cover fixed to said wall of said heating chamber by being engaged with a hole, which is provided in said wall of said heating chamber and positioned on the center axis of said cylindrical wave guide, to cover said at least one arcuate slit.

12. A high frequency heating device according to claim 8, wherein said wall of said heating chamber has an outer surface, said opposite end of said cylindrical wave guide being coupled to said outer surface.

13. A high frequency heating device comprising:
- a microwave energy source which includes a magnetron having an antenna stub, the antenna stub having a longitudinal axis;
- a hollow wave guide having first and second ends and having a longitudinal axis which extends through the first and second ends, the wave guide additionally having an inner surface which is rotationally symmetrical with respect to the longitudinal axis of the wave guide, the microwave energy source being mounted at the first end of the wave guide, with the longitudinal axis of the antenna stub coinciding with the longitudinal axis of the wave guide; and
- a heating chamber for accommodating an object to be heated, the heating chamber having a flat wall with an arcuate slit therein, the second end of the wave guide being connected to the wall so that the wall is perpendicular to the longitudinal axis of the wave guide and so that the slit communicates with the wave guide, the slit having a center of curvature which is positioned on the longitudinal axis of the wave guide.

14. A high frequency heating device according to claim 13, wherein the slit has a first portion with a first radial width and a second portion with a second radial width that is greater than the first radial width.

15. A high frequency heating device according to claim 13, wherein the wall has at least one further arcuate slit which communicates with the wave guide.

16. A high frequency heating device according to claim 13, wherein the wall has a tab extending from the periphery of the slit, the tab being bent into the wave guide.

17. A high frequency heating device according to claim 16, wherein the tab is bent perpendicular to the wall.

18. A high frequency heating device according to claim 13, wherein the wall has a hole that is positioned along the longitudinal axis of the wave guide, and further comprising a cover having a projection which extends into the hole to mount the cover on the wall, the cover extending over the slit.

* * * * *